US011589265B2

(12) United States Patent  
Desai et al.

(10) Patent No.: US 11,589,265 B2
(45) Date of Patent: Feb. 21, 2023

(54) ITERATIVE AUTOMATED FREQUENCY COORDINATION

(71) Applicant: Cisco Technology, Inc., San Jose, CA (US)

(72) Inventors: Vishal S. Desai, San Jose, CA (US); Jerome Henry, Pittsboro, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/443,409

(22) Filed: Jul. 26, 2021

(65) Prior Publication Data

US 2023/0022388 A1    Jan. 26, 2023

(51) Int. Cl.
*H04W 28/16* (2009.01)
*H04W 52/38* (2009.01)

(52) U.S. Cl.
CPC .......... *H04W 28/16* (2013.01); *H04W 52/38* (2013.01)

(58) Field of Classification Search
CPC ..... H04W 72/04; H04W 88/08; H04W 76/00; H04W 52/38; H04W 28/16
See application file for complete search history.

(56) References Cited

U.S. PATENT DOCUMENTS

| 10,609,574 | B2 | 3/2020 | Desai et al. | |
|---|---|---|---|---|
| 2004/0142696 | A1* | 7/2004 | Saunders | H04W 16/14 455/450 |
| 2010/0099434 | A1* | 4/2010 | Murayama | G01S 19/235 455/456.1 |
| 2016/0330579 | A1 | 11/2016 | Alizadeh-Shabdiz et al. | |
| 2020/0196107 | A1 | 6/2020 | Pegg et al. | |
| 2020/0260289 | A1 | 8/2020 | MacMullan et al. | |
| 2020/0359229 | A1* | 11/2020 | Macmullan | H04W 16/14 |
| 2020/0367020 | A1* | 11/2020 | Ansley | H04W 64/00 |
| 2020/0413491 | A1* | 12/2020 | Ansley | H04W 92/02 |
| 2021/0058856 | A1 | 2/2021 | Qi et al. | |
| 2021/0068070 | A1* | 3/2021 | Segev | H04W 28/16 |
| 2021/0120556 | A1* | 4/2021 | Segev | H04W 28/16 |

(Continued)

OTHER PUBLICATIONS

Qualcomm, "Qualcomm Launches Wi-Fi SON (Self Organizing Network) Solutions to Simplify Wi-Fi Networking and Optimize User Experience," Press Release, dated Jan. 5, 2016, pp. 1-4.

(Continued)

*Primary Examiner* — Hassan A Phillips
*Assistant Examiner* — Prenell P Jones
(74) *Attorney, Agent, or Firm* — Patterson + Sheridan, LLP

(57) ABSTRACT

A method includes performing a first iteration of automated frequency coordination (AFC) using geospatial coordinates of a first access point at a site and a first margin of error to determine a first number of allowed channels for the first access point and performing a second iteration of AFC using the geospatial coordinates of the first access point and a second margin of error to determine a second number of allowed channels for the first access point. The first margin of error is lower than the second margin of error. The method also includes, in response to determining that a difference between the first number and the second number meets a threshold, instructing a second access point at the site to perform AFC using the second margin of error rather than the first margin of error.

20 Claims, 3 Drawing Sheets

(56) References Cited

U.S. PATENT DOCUMENTS

2021/0144724 A1   5/2021   MacMullan et al.

OTHER PUBLICATIONS

Cisco, "RRM Data Collection Activities," Radio Resource Management White Paper, pp. 1-4.
Aruba Networks, "Understanding ARM," pp. 1-2.
International Search Report and Written Opinion for PCT Application No. PCT/US2022/074067, dated Nov. 15, 2022.

* cited by examiner

ITERATIVE AUTOMATED FREQUENCY COORDINATION

TECHNICAL FIELD

Embodiments presented in this disclosure generally relate to automated frequency coordination (AFC). More specifically, embodiments disclosed herein relate to an iterative AFC process for distributed access points that provide network coverage for an environment.

BACKGROUND

Certain network implementations deploy multiple access points across an environment so that the access points provide network coverage for different portions of the environment. For example, the access points may be deployed in different floors of a building or different parts of a large auditorium or conference space. The access points may be required to perform AFC using geospatial coordinates and heights of the access points to determine the number of channels and the power budgets that the access points may use without interfering too much with other access points in the vicinity (e.g., other, existing network deployments). It may be difficult, however, to determine the geospatial coordinates and heights of every access point in the network (e.g., access points installed on tall ceilings or access points that are hidden from view).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes performing a first iteration of automated frequency coordination (AFC) using geospatial coordinates of a first access point at a site and a first margin of error to determine a first number of allowed channels for the first access point and performing a second iteration of AFC using the geospatial coordinates of the first access point and a second margin of error to determine a second number of allowed channels for the first access point. The first margin of error is lower than the second margin of error. The method also includes, in response to determining that a difference between the first number and the second number meets a threshold, instructing a second access point at the site to perform AFC using the second margin of error rather than the first margin of error. Other embodiments include an apparatus that performs this method.

According to another embodiment, a method includes performing a first iteration of AFC using a first margin of error to determine a first number of allowed channels for a first access point and performing a second iteration of AFC using a second margin of error to determine a second number of allowed channels for the first access point. The method also includes, in response to determining that a difference between the first number and the second number meets a threshold, instructing a second access point to perform AFC using the second margin of error rather than the first margin of error. Other embodiments include an apparatus that performs this method.

EXAMPLE EMBODIMENTS

This disclosure describes an access point controller that coordinates an AFC process for several access points deployed across an environment. The access point controller performs an iterative AFC process using the geospatial coordinates and height of one of the access points in the network (e.g., an access point near a boundary of the environment). The access point controller adjusts a margin of error for the geospatial coordinates and/or the height during each iteration. The access point controller analyzes the results of each iteration to determine an acceptable margin of error. For example, the access point controller may determine how the AFC results change as the margin of error is adjusted. If a difference between the AFC results does not exceed a threshold with adjustments in the margin of error, then the access point controller may use the larger or largest of the margins of error to perform AFC for the other access points in the network. The increased margin of error allows AFC to be performed even when the geospatial coordinates and/or heights of the other access points are approximated or not accurately known. Stated differently, the access point controller determines a margin of error that can be used in AFC without changing the AFC results beyond a threshold.

Figure 1A:
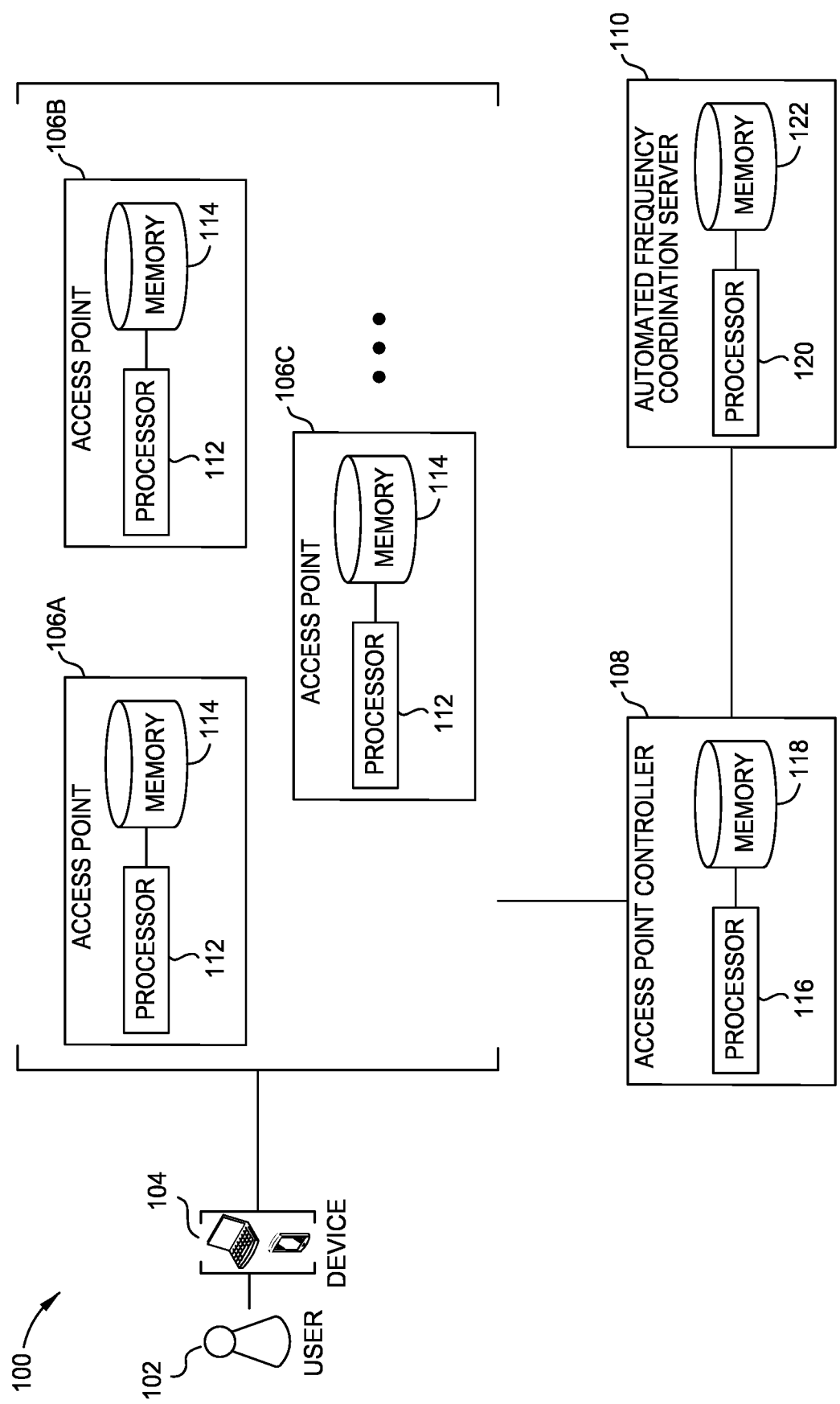
FIG. 1A illustrates an example system.

FIG. 1A illustrates an example system 100. As seen in FIG. 1A, the system 100 includes a device 104, one or more access points 106, an access point controller 108, and an AFC server 110. The device 104 connects to one or more access points 106 to gain access to a network. The access point controller 108 administers the access points 106. Specifically, the access point controller 108 orchestrates an AFC process for the access points 106 with the AFC server 110. In particular embodiments, the access point controller 108 determines a suitable margin of error for an AFC process so that the AFC process may be performed for an access point 106 even though the geospatial coordinates and/or heights of the access point 106 are not accurately known.

A user 102 uses the device 104 to connect to one or more access points 106. The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The access points 106 are deployed at different locations across a space or area to provide network coverage for the space or area. Each access point 106 provides network coverage for a portion of the space or area. For example, the access points 106 may be distributed across different floors of a building with each access point 106 providing network coverage for a portion of a floor of the building. As another example, the access points 106 may be distributed across a large auditorium or conference space with each access point 106 providing network coverage for a portion of the auditorium or conference space. The system 100 may include any suitable number of access points 106. As seen in FIG. 1A, the system 100 includes access points 106A, 106B, and 106C. Each of the access points 106 include a processor 112 and a memory 114, which are configured to perform any of the actions or functions of the access point 106 described herein.

The processor 112 is any electronic circuitry, including, but not limited to one or a combination of microprocessors, microcontrollers, application specific integrated circuits (ASIC), application specific instruction set processor (ASIP), and/or state machines, that communicatively couples to memory 114 and controls the operation of the access point 106. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on the memory 114 to perform any of the functions described herein. The processor 112 controls the operation and administration of the access point 106 by processing information (e.g., information received from the devices 104, access point controller 108, and memory 114). The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The access points 106 may need to perform an AFC process with the AFC server 110 to determine certain communication characteristics that minimize or reduce interference with incumbent networks and their equipment. For example, as a result of the AFC process, the access points 106 may be instructed as to the number of channels and/or power budget that the access points 106 are allowed to use when communicating with other components of the system 100. The access points 106 may then communicate according to these communication characteristics. To perform the AFC process, certain values (e.g., the geospatial coordinates and the height of an access point 106) are provided to the AFC server 110. When the network deployment includes several access points 106 distributed across a large space or area, however, it may not be possible to accurately determine the geospatial coordinates and the heights of every access point 106. As a result, the AFC process for the access points 106 may not be performed or may not be performed using accurate information, which negatively impacts the communication characteristics provided to the access points 106. In some instances, a margin of error for the geospatial coordinates or the height is also provided to the AFC server 110 to indicate a level of uncertainty in the provided geospatial coordinates or height. The AFC server 110 accounts for this margin of error when determining the communication characteristics.

The access point controller 108 performs an iterative AFC process to determine a suitable margin of error. The access point controller 108 then applies that margin of error to the AFC processes for the access points 106 in the system 100. As a result of using this margin of error, the AFC process may be performed for the access points 106 in the system 100 even though the geospatial coordinates and/or heights of the access points 106 are not accurately known. As seen in FIG. 1A, the access point controller 108 includes a processor 116 and a memory 118, which are configured to perform any of the actions or functions of the access point controller 108 described herein.

The processor 116 is any electronic circuitry, including, but not limited to one or a combination of microprocessors, microcontrollers, application specific integrated circuits (ASIC), application specific instruction set processor (ASIP), and/or state machines, that communicatively couples to memory 118 and controls the operation of the access point controller 108. The processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 116 may include other hardware that operates software to control and process information. The processor 116 executes software stored on the memory 118 to perform any of the functions described herein. The processor 116 controls the operation and administration of the access point controller 108 by processing information (e.g., information received from the devices 104, access points 106, and memory 118). The processor 116 is not limited to a single processing device and may encompass multiple processing devices.

The memory 118 may store, either permanently or temporarily, data, operational software, or other information for the processor 116. The memory 118 may include any one or a combination of volatile or non-volatile local or remote devices suitable for storing information. For example, the memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 118, a disk, a CD, or a flash drive. In particular embodiments, the software may include an application executable by the processor 116 to perform one or more of the functions described herein.

The AFC server 110 performs AFC processes for the access points 106 in the system 100. The access point controller 108 provides the AFC server 110 with the geospatial coordinates and/or heights of an access point 106. The access point controller 108 also provides a margin of error to the AFC server 110. The AFC server 110 uses this information to determine incumbent networks and their equipment that may be affected by the transmissions of the access point 106. The AFC server 110 then determines certain communication characteristics for the access point 106 (e.g., the number of channels and a power budget) that would reduce or minimize the interference caused by the access point 106 to the incumbent networks or their equipment. The AFC server 110 communicates these communication characteristics to the access point controller 108 and/or the access point 106. The access point 106 may then communicate according to these characteristics to reduce or minimize interference with incumbent networks and their equipment, in certain embodiments. As seen in FIG. 1A, the AFC server 110 includes a processor 120 and a memory 122, which are configured to perform any of the actions or functions of the AFC server 110 described herein.

The processor 120 is any electronic circuitry, including, but not limited to one or a combination of microprocessors, microcontrollers, application specific integrated circuits (ASIC), application specific instruction set processor (ASIP), and/or state machines, that communicatively couples to memory 122 and controls the operation of the AFC server 110. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on the memory 122 to perform any of the functions described herein. The processor 120 controls the operation and administration of the AFC server 110 by processing information (e.g., information received from the access point controller 108, access points 106, and memory 122). The processor 120 is not limited to a single processing device and may encompass multiple processing devices.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a CD, or a flash drive. In particular embodiments, the software may include an application executable by the processor 120 to perform one or more of the functions described herein.

Figure 1B:
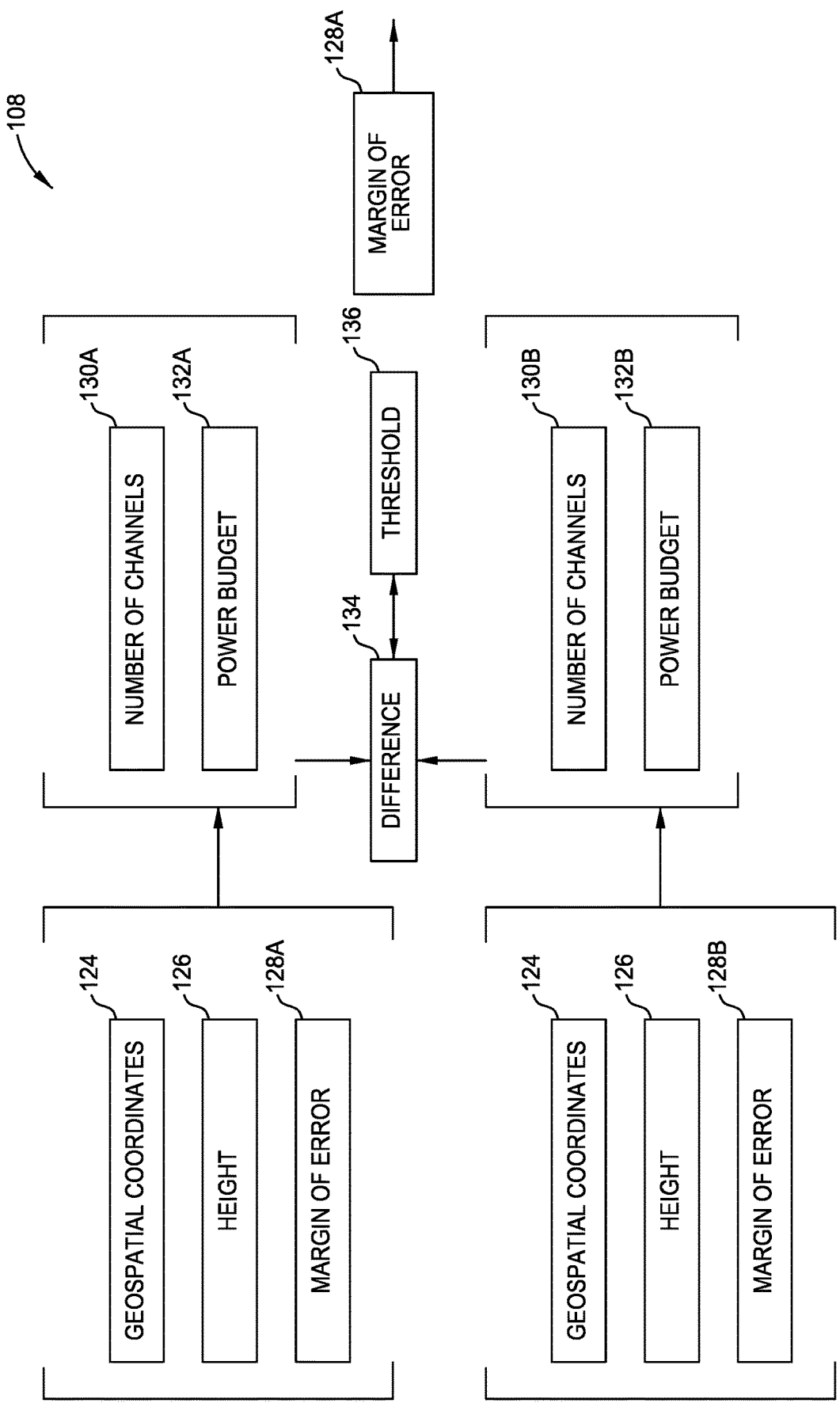
FIG. 1B illustrates an example access point controller in the system of FIG. 1A.

FIG. 1B illustrates an example access point controller 108 in the system 100 of FIG. 1. Generally, the access point controller 108 performs an iterative AFC process to determine a suitable margin of error. In particular embodiments, the access point controller 108 uses the margin of error to perform AFC processes for the access points 106 in the system 100, even when the geospatial coordinates and/or heights of the access points 106 are not accurately known.

The access point controller 108 performs a first iteration of an AFC process for a base access point in the system 100. In certain embodiments, the base access point is an access point 106 near a boundary of the network deployment in the system 100. For example, the base access point may be installed near the border of a building, auditorium, or conference space. Because the access point 106 near the border of the deployment is likely the closest to an incumbent network and its equipment, transmissions from the access point 106 near the border are likely to affect the incumbent network and its equipment the most relative to the other access points 106 in the system 100. Thus, performing AFC for the access point 106 near the border is likely to yield the most restrictive results and to see the largest changes in the AFC results relative to changes in the margin of error. Thus, if a suitable margin of error is found by performing AFC for the access point 106 near the border, then it is likely that this margin of error can be safely used by the other access points 106 in the system 100. In the example of FIG. 1A, the access point 106A may be the base access point. The access point controller 108 uses the geospatial coordinates 124 and the height 126 for the base access point 106A to perform the AFC process. The geospatial coordinates 124 and/or the height 126 for the base access point 106A may be measured by a user 102. For example, the user 102 may place the device 104 near the base access point 106A and use an application on the device 104 to determine the geospatial coordinates of the device 104. The user 102 then uses these geospatial coordinates as the geospatial coordinates 124 of the base access point 106A. As another example, the user 102 may use a measuring tape to determine the height 126 of the base access point 106A. The access point controller 108 also provides a margin of error 128A representing a level of uncertainty in the geospatial coordinates 124 and/or the height 126. The user 102 may preset the initial margin of error 128A in the access point controller 108. Additionally or alternatively, the initial margin of error 128A may be determined from previous iterations of AFC for the base access point 106A.

By performing the first iteration of the AFC process, the access point controller 108 receives a number of channels 130A and a power budget 132A that the base access point 106A may use to reduce or minimize interference with incumbent networks and their equipment in the vicinity of the base access point 106A. The number of channels 130A indicates the number of communication channels that the base access point 106A is allowed to use to communicate with the devices 104 and/or other access points 106. The power budget 132A indicates a maximum transmission power that the base access point 106A is allowed to use when communicating with the devices 104 and/or other access points 106.

The access point controller 108 performs a second iteration of the AFC process for the base access point 106A using an adjusted margin of error 128B. The access point controller 108 again uses the geospatial coordinates 124 and the height 126 of the base access point 106A. The margin of error 128B may be larger or smaller than the margin of error 128A. By performing the second iteration of the AFC process, the access point controller 108 determines whether the results of the AFC process change significantly when the margin of error 128 is adjusted higher or lower. The access point controller 108 receives the results of the second iteration of the AFC process, which include a number of channels 130B and a power budget 132B. Similar to the number of channels 130A, the number of channels 130B indicates the number of channels that the base access point 106A is allowed to use to communicate with the devices 104 and/or other access points 106. Similar to the power budget 132A, the power budget 132B indicates a maximum transmission power that the base access point 106A is allowed to use to communicate with the device 104 and/or other access points 106.

The access point 108 then calculates a difference 134 between the number of channels 130 and/or the power budgets 132 between the different iterations of the AFC process. For example, the difference 134 may be a difference in the number of channels 130 that the base access point 106A is allowed to use (e.g., the difference between number of channels 130A and the number of channels 130B). As another example, the difference 134 may be a difference in the transmission powers that the base access point 106A is allowed to use (e.g., the difference between the power budget 132A and the power budget 132B).

The access point controller 108 compares the difference 134 with a threshold 136 to determine whether the difference 134 is significant. For example, if the difference 134 exceeds the threshold 136, then the access point 108 may determine that the results of the AFC process changed significantly and that the smaller margin of error 128 between the margin of error 128A and the margin of error 128B should be used for the AFC processes of the other access points 106 in the system 100. If the difference 134 meets or is below the threshold 136, then the access point controller 108 determines that the difference 134 is not too large and that the larger margin of error 128 between the margin of error 128A and the margin of error 128B should be used for the AFC processes of the other access points 106 in the system 100. The larger margin of error 128 will allow for a greater level of inaccuracy in the geospatial coordinates and/or heights of the other access points 106 when performing AFC for the other access points 106, which may even allow for the geospatial coordinates and/or heights of the other access points 106 to be approximated rather than accurately measured.

In the example of FIG. 1B, the access point controller 108 determines that the margin of error 128A should be used for the AFC processes of the other access points 106 in the system 100. For example, the margin of error 128B may have been larger than the margin of error 128A, but the difference 134 may have exceeded the threshold 136. In response, the access point controller 108 selects the smaller margin of error 128A. As another example, the margin of error 128B may have been smaller than the margin of error 128A, and the difference 134 may have met or fallen below the threshold 136. In response, the access point controller 108 selects the larger margin of error 128A. The access point controller 108 then initiates AFC processes for the other access points 106 in the system 100 using the margin of error 128A to initiate these AFC processes. As a result, the access point controller 108 determines a suitable margin of error 128 that is used for the AFC processes of other access points 106 when the geospatial coordinates 124 and/or the heights 126 of these access points 106 is not accurately known.

The access point controller 108 may perform any suitable number of iterations of the AFC process for the base access point 106A to determine the suitable margin of error 128 for the system 100. Using the example of FIG. 1B, if the access point controller 108 determines that the difference 134 exceeds the threshold 136, then the access point controller 108 may determine that the difference 134 is too large. In response, the access point controller 108 performs a third iteration of the AFC process using the geospatial coordinates 124 and the height 126 of the base access point 106A and another margin of error 128 that is smaller than the margin of error 128B and larger than the margin of error 128A. The access point controller 108 then determines another difference based on comparing the results of the first or the second iterations of the AFC process with the results of the third iteration of the AFC process. The access point controller 108 then compares the new difference with the threshold 136 to determine if the reduced margin of error reduced the new difference below the threshold 136. For example, the new iteration of the AFC process may return a new number of channels in a new power budget. The access point controller 108 compares the new number of channels and the new power budget with the number of channels 130A and the power budget 132A to determine a new difference. The access point controller 108 then compares the new difference with the threshold 136 to determine if the reduced margin of error reduced the new difference below the threshold 136. If the new difference is below the threshold 136, then the access point controller 108 determines that the new margin of error should be used for the AFC processes of other access points 106.

In some embodiments, the access point controller 108 determines the threshold 136 based on information about the access points 106 in the system 100. For example, the access point controller 108 may determine the threshold 136 based on a floor map indicating the locations of the access points 106 in the network deployment. Based on distances between the access points 106, the access point controller 108 determines what magnitude of change in the number of channels 130 and/or the power budget 132 would be significant for the access points 106 in the system 100. For example, if the access points 106 are deployed closer together, then the access point controller 108 may determine that the threshold 136 should be larger to accommodate larger changes in the number of channels 130 and/or the power budget 132. If the floor map indicates that the access points 106 are spaced further apart, then the access point controller 108 may determine a smaller threshold 136 to accommodate smaller changes in the number of channels 130 and/or the power budget 132, so as to not lose network coverage in certain areas serviced by the access points 106.

In some embodiments, the access point controller 108 allows a user 102 to override the determinations of the access point controller 108. For example, the access point controller 108 may allow or instruct a user 102 to manually supply a margin of error to be used for the AFC process for a particular access point 106. If the user 102 supplies a margin of error to be used for the access point 106, then the access point controller 108 uses the manually supplied margin of error when initiating the AFC process for that access point 106.

In certain embodiments, the access point controller 108 also determines a transmission power to be provided across the different iterations of the AFC process for the base access point 106A. The access point controller 108 first determines a standard power capability for the base access point 106A based on standard power levels approved under various regulatory domains (e.g., the United States or the South Korea regulatory domains). The access point controller 108 then determines overlaps in the transmit region of the base access point 106A with the transmit regions of other access points 106 in the system 100 using the different standard power levels specified under the different regulatory domains. The access point controller 108 then determines a transmit power for the base access point 106A based on the overlaps in the transmit regions. For example, the access point controller 108 may lower the transmit power of the base access point 106A based on the number of access points 106 whose transmit regions overlap with the transmit region of the base access point 106A, the bandwidth of these access points 106, and/or the power spectrum density of these access points 106. The access point controller 108 may determine a lower transmit power for the base access point 106A to reduce the chances that the base access point 106A interferes with the other access points 106. The access point controller 108 then supplies the transmit power to initiate the different iterations of the AFC process.

In some embodiments, the access point controller 108 initiates AFC processes for other access points 106 in the system 100 using the geospatial coordinates 124 and the height 126 of the base access point 106A in addition to the margin of error 128 determined through the different iterations of the AFC process for the base access point 106. For example, the access point controller 108 may determine that another access point 106B in the system 100 is installed close to the base access point 106A such that application of the margin of error to the geospatial coordinates 124 of the base access point 106A would encompass the location of the other access point 106B. In response, the access point controller 108 initiates the AFC process for the other access point 106B using the geospatial coordinates 124 of the base access point 106A along with the margin of error. In this manner, the access point controller 108 initiates the AFC process for other access point 106B using the geospatial coordinates 124 of the base access point 106A as a proxy for the location of the other access point 106*6*.

Figure 2:
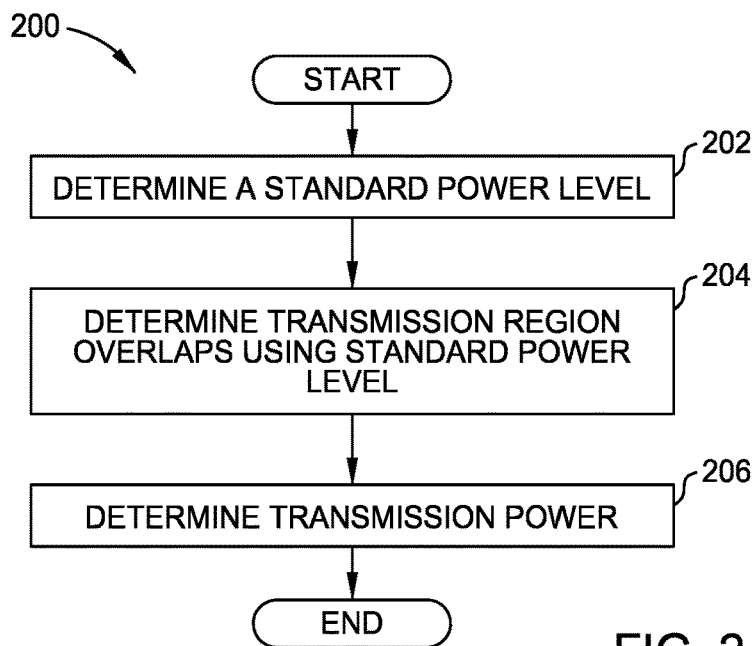
FIG. 2 is a flowchart of an example method performed in the system of FIG. 1A.

FIG. 2 is a flowchart of an example method 200 performed in the system 100 of FIG. 1A. In particular embodiments, the access point controller 108 performs the method 200 to determine a transmission power to be used when initiating an iteration of the AFC process for a base access point 106A.

The access point controller 108 begins by determining a standard power level 202 for the base access point 106A in block 202. The access point controller 108 may determine the standard power level based on requirements set by different government regulatory domains (e.g., the United States regulatory domain or the South Korean regulatory domain). In block 204, the access point controller 108 determines transmission region overlaps using the determined standard power level. For example, the access point controller 108 may determine that the transmit region of the base access point 106A overlaps a transmit region of another access point 106 in the system 100 when using the standard power level. In block 206, the access point controller 108 determines a transmission power for the base access point 106A. For example, the access point controller 108 may reduce the transmission power of the base access point 106A based on the transmission region overlaps. If the transmission region overlap for the base access point 106A is too large, the access point controller 108 may reduce the transmission power of the base access point 106A in block 206.

After determining the transmission power for the base access point 106A that does not cause too large of an overlap, the access point controller 108 may use the transmission power to initiate the iterations of the AFC process for the base access point 106A.

Figure 3:
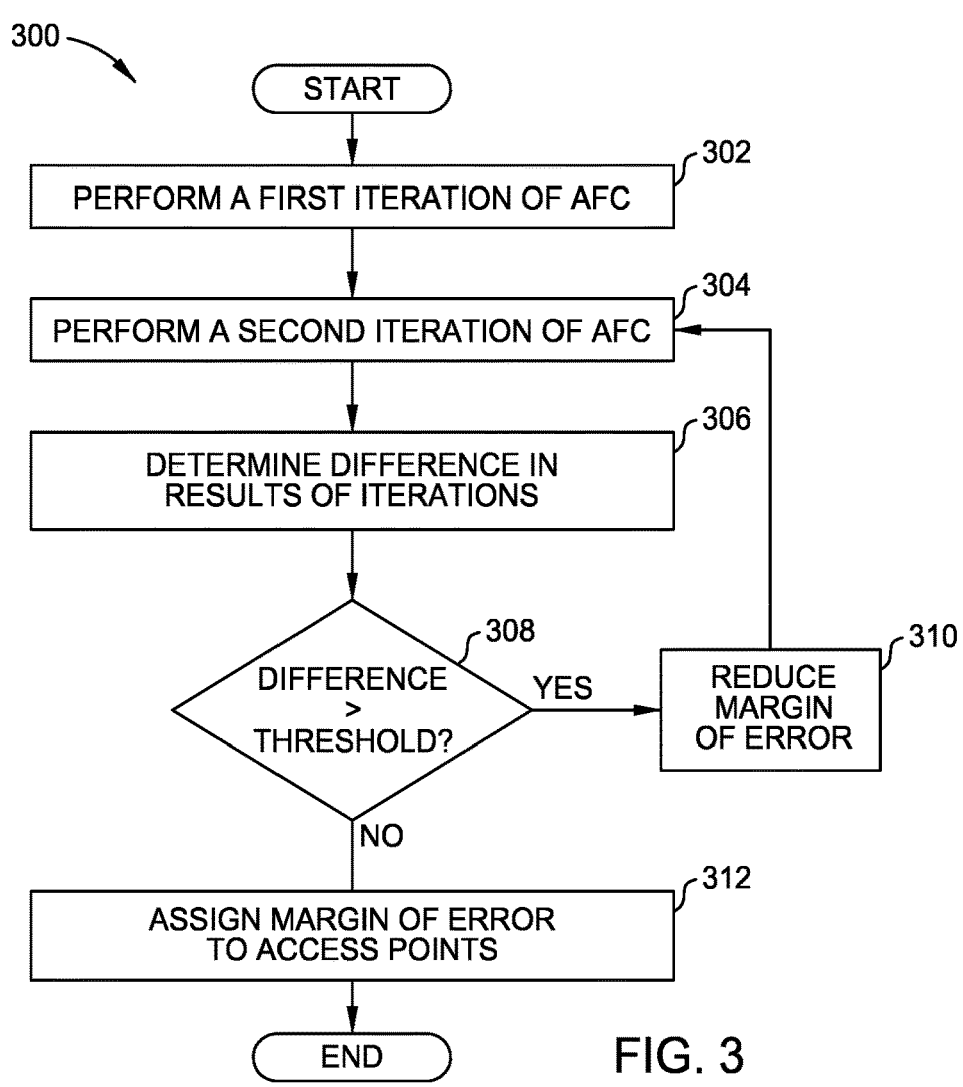
FIG. 3 is a flowchart of an example method performed in the system of FIG. 1A.

FIG. 3 is a flowchart of an example method 300 performed in the system 100 of FIG. 1A. In particular embodiments, the access point controller 108 performs the method 300 to determine a suitable margin of error for the AFC processes for the access points 106 in the system 100.

In block 302, the access point controller 108 performs a first iteration of AFC for a base access point 106A. The access point controller 108 may initiate the first iteration of AFC using the geospatial coordinates 124 and/or the height 126 of the base access point 106A. Additionally, the access point controller 108 may supply an initial margin of error 128A for the first iteration of AFC. In block 304, the access point controller 108 performs a second iteration of AFC for the base access point 106A. The access point controller 108 initiates the second iteration of AFC using the geospatial coordinates 124 and/or the height 126 of the base access point 106. The access point controller 108 also supplies a second margin of error 128B to initiate the second iteration of AFC. The second margin of error 128B may be greater than the initial margin of error 128A. In some embodiments, the access point controller 108 also uses the transmission power of the base access point 106A that was determined using the method 200 described in FIG. 2 to perform both iterations of the AFC process.

The access point controller 108 receives the results of the first and second iterations of AFC. The results for the first iteration of AFC may indicate a number of channels 130A and a power budget 132A that the base access point 106A is allowed to use. The results of the second iteration of AFC may indicate a number of channels 130B and a power budget 132B that the base access point 106A is allowed to use. In block 306, the access point controller 108 determines a difference 134 in the results of the iterations. For example, the difference 134 may be a difference in the number of channels 130 between the two sets of results (e.g., by subtracting the number of channels 130A from the number of channels 130A) and/or a difference in the power budgets 132 in the two sets of results (e.g., by subtracting the power budget 132B from the power budget 132A).

In block 308, the access point controller 108 determines whether the difference 134 exceeds a threshold 136. If the difference 134 exceeds the threshold 136, the access point controller 108 determines that the margin of error 128B was too high. In response, the access point controller 108 reduces the margin of error 128B, but keeps the margin of error 128A at the same value, and returns to block 304 to perform another iteration of AFC using the reduced margin of error. As a result, the access point controller 108 may reduce the difference 134 below the threshold 136. The access point controller 108 continues to perform iterations of the AFC process with adjusted margins of error until the access point controller 108 determines a suitable margin of error that reduces the difference 134 below the threshold 136. If the difference 134 meets or falls below the threshold 136, the access point controller 108 assigns the margin of error 128*6* to the access points 106 in the system 100. When the access point 108 subsequently initiates the AFC process for the access points 106 in the system 100, the access point controller 108 uses the suitable margin of error determined in blocks 302, 304, 306, 308 and 310. As a result, the access point controller 108 initiates AFC for the other access points 106 and the system 100, even though the geospatial coordinates and/or heights of the other access points 106 may not be accurately known.

In summary, an access point controller 108 coordinates an AFC process for several access points 106 deployed across an environment. The access point controller 108 performs an iterative AFC process using the geospatial coordinates 124 and height 126 of one of the access points 106 in the network (e.g., an access point 106 near a boundary of the space or area). The access point controller 108 adjusts a margin of error 128 for the geospatial coordinates 124 and/or the height 126 during each iteration. The access point controller 108 analyzes the results of each iteration to determine an acceptable margin of error 128. For example, the access point controller 108 may determine how the AFC results change as the margin of error 128 is adjusted. If a difference 134 between the AFC results does not exceed a threshold 136 with adjustments in the margin of error 128, then the access point controller 108 may use the larger or largest of the margins of error 128 to perform AFC for the other access points 106 in the network. The increased margin of error 128 allows AFC to be performed even when the geospatial coordinates 124 and/or heights 126 of the other access points 106 are approximated or not accurately known. Stated differently, the access point controller 108 determines a margin of error that can be used in AFC across the environment without changing the AFC results beyond a threshold 136.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
    performing a first iteration of automated frequency coordination (AFC) using geospatial coordinates of a first access point at a site and a first margin of error to determine a first number of allowed channels for the first access point;
    performing a second iteration of AFC using the geospatial coordinates of the first access point and a second margin of error to determine a second number of allowed channels for the first access point, wherein the first margin of error is lower than the second margin of error; and
    in response to determining that a difference between the first number and the second number meets a threshold, instructing a second access point at the site to perform AFC using the second margin of error rather than the first margin of error.

2. The method of claim 1, further comprising determining a transmit power for the first access point based on an overlap of a transmit region of the first access point and a transmit region of the second access point, wherein the first and second iterations of AFC are performed using the transmit power.

3. The method of claim 1, further comprising instructing the second access point to perform AFC using the geospatial coordinates of the first access point.

4. The method of claim 1, wherein the threshold is based on one of a map of the site or a distance between the first access point and the second access point.

5. The method of claim 1, wherein the first access point is closer to a border of the site than the second access point.

6. The method of claim 1, further comprising performing a third iteration of AFC using the geospatial coordinates of the first access point and a third margin of error to determine a third number of allowed channels for the first access point, wherein the third margin of error is higher than the second margin of error, and wherein the second iteration of AFC is performed in response to determining that a difference between the third number and the first number does not meet the threshold.

7. The method of claim 1, further comprising instructing a user to set a margin of error for when a third access point at the site performs AFC.

8. An apparatus comprising:
    a memory; and
    a hardware processor communicatively coupled to the memory, the hardware processor configured to:
        perform a first iteration of AFC using geospatial coordinates of a first access point at a site and a first margin of error to determine a first number of allowed channels for the first access point;
        perform a second iteration of AFC using the geospatial coordinates of the first access point and a second margin of error to determine a second number of allowed channels for the first access point, wherein the first margin of error is lower than the second margin of error; and
        in response to determining that a difference between the first number and the second number meets a threshold, instruct a second access point at the site to perform AFC using the second margin of error rather than the first margin of error.

9. The apparatus of claim 8, the hardware processor further configured to determine a transmit power for the first access point based on an overlap of a transmit region of the first access point and a transmit region of the second access point, wherein the first and second iterations of AFC are performed using the transmit power.

10. The apparatus of claim 8, the hardware processor further configured to instruct the second access point to perform AFC using the geospatial coordinates of the first access point.

11. The apparatus of claim 8, wherein the threshold is based on one of a map of the site or a distance between the first access point and the second access point.

12. The apparatus of claim 8, wherein the first access point is closer to a border of the site than the second access point.

13. The apparatus of claim 8, the hardware processor further configured to perform a third iteration of AFC using the geospatial coordinates of the first access point and a third margin of error to determine a third number of allowed channels for the first access point, wherein the third margin of error is higher than the second margin of error, and wherein the second iteration of AFC is performed in response to determining that a difference between the third number and the first number does not meet the threshold.

14. The apparatus of claim 8, the hardware processor further configured to instruct a user to set a margin of error for when a third access point at the site performs AFC.

15. A method comprising:
    performing a first iteration of AFC using a first margin of error to determine a first number of allowed channels for a first access point;
    performing a second iteration of AFC using a second margin of error to determine a second number of allowed channels for the first access point; and
    in response to determining that a difference between the first number and the second number meets a threshold, instructing a second access point to perform AFC using the second margin of error rather than the first margin of error.

16. The method of claim 15, wherein the first margin of error is lower than the second margin of error.

17. The method of claim 15, wherein the first and second iterations of AFC use geospatial coordinates of the first access point.

18. The method of claim 17, further comprising instructing the second access point to perform AFC using the geospatial coordinates of the first access point.

19. The method of claim 15, wherein the threshold is based on one of a map or a distance between the first access point and the second access point.

20. The method of claim 15, wherein the first access point is closer to a border of a site than the second access point.

* * * * *

UNITED STATES PATENT AND TRADEMARK OFFICE
CERTIFICATE OF CORRECTION

PATENT NO. : 11,589,265 B2
APPLICATION NO. : 17/443409
DATED : February 21, 2023
INVENTOR(S) : Vishal S. Desai et al.

Page 1 of 1

It is certified that error appears in the above-identified patent and that said Letters Patent is hereby corrected as shown below:

In the Specification

In Column 9, Line 41, delete "1066." and insert -- 106B. --.

In Column 10, Line 61, delete "1286" and insert -- 128B --.

Signed and Sealed this
Twenty-seventh Day of June, 2023

Katherine Kelly Vidal
*Director of the United States Patent and Trademark Office*